(12) United States Patent
Pollard, Jr. et al.

(10) Patent No.: US 7,903,924 B2
(45) Date of Patent: Mar. 8, 2011

(54) CONNECTOR FOR SPLICING AND HANGING CABLE TRAYS

(75) Inventors: Michael E. Pollard, Jr., Greenville, SC (US); Raymond A. Colgrove, Simpsonville, SC (US); James Q. Looney, Fountain Inn, SC (US); Ernest R. Whittaker, Moore, SC (US)

(73) Assignee: M P Husky, LLC, Greenville, SC (US)

( * ) Notice: Subject to any disclaimer, the term of this patent is extended or adjusted under 35 U.S.C. 154(b) by 0 days.

(21) Appl. No.: 12/384,844

(22) Filed: Apr. 9, 2009

(65) Prior Publication Data

US 2010/0260463 A1   Oct. 14, 2010

(51) Int. Cl.
G02B 6/00 (2006.01)

(52) U.S. Cl. ......... 385/135; 385/136; 403/346; 403/397; 248/249; 248/302; 211/106; 211/106.01; 211/126.1; 211/133.5

(58) Field of Classification Search .............. 385/95–99, 385/134–137; 403/346, 391, 396–399; 248/49, 248/249, 300, 302; 174/19, 480, 481; 211/106, 211/106.01, 126.1, 133.5
See application file for complete search history.

(56) References Cited

U.S. PATENT DOCUMENTS

| | | | |
|---|---|---|---|
| 4,359,262 A * | 11/1982 | Dolan | 385/135 |
| 4,733,986 A | 3/1988 | Kenning et al. | |
| 5,004,192 A * | 4/1991 | Handler | 248/49 |
| 5,100,086 A | 3/1992 | Rinderer | |
| 5,384,937 A * | 1/1995 | Simon | 24/295 |
| 5,580,014 A | 12/1996 | Rinderer | |
| 5,704,571 A | 1/1998 | Vargo | |
| 6,247,871 B1 * | 6/2001 | Nickel et al. | 403/396 |
| 6,959,898 B1 * | 11/2005 | Laughlin et al. | 248/60 |
| 7,544,895 B2 * | 6/2009 | Penichon | 174/135 |
| 7,708,491 B2 * | 5/2010 | Quertelet et al. | 403/346 |
| 2005/0063775 A1 | 3/2005 | Boltz | |
| 2008/0179089 A1 | 7/2008 | Deciry et al. | |

FOREIGN PATENT DOCUMENTS

WO    WO 2007006961 A1 *  1/2007

OTHER PUBLICATIONS

Cablofil; titled "Faslock"; copyright 2005 Cablofil, Inc.; http://www.cablofil.com/MediaLibrary/CABCS0337%20-%20FASLOCK.pdf visited Apr. 9, 2009; Mascoutah, Illinois, USA; (3 pages).

* cited by examiner

*Primary Examiner* — Daniel Petkovsek
(74) *Attorney, Agent, or Firm* — J. Bennett Mullinax, LLC

(57) ABSTRACT

A connector that can function as a cable tray splice is provided. The connector may have a frame that is configured for being placed against first and second portions of cable tray. The connector may also have a flange located at an end of the frame that is capable of being shaped by a user. The flange and the frame define an aperture. A connector that may be a configured as a cable tray hanger and a method of securing a connector to the cable tray are also provided.

14 Claims, 10 Drawing Sheets

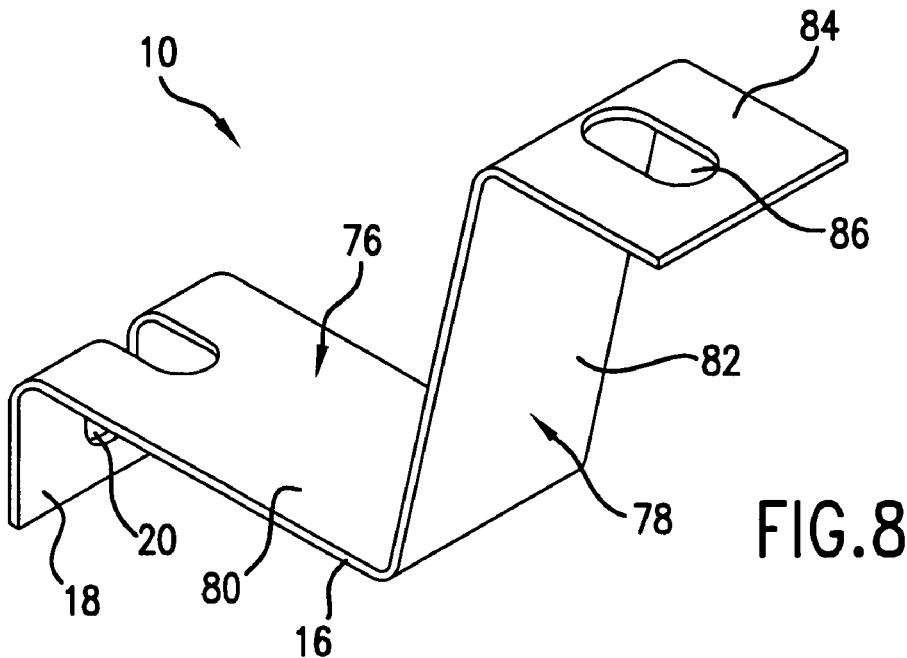
FIG.8
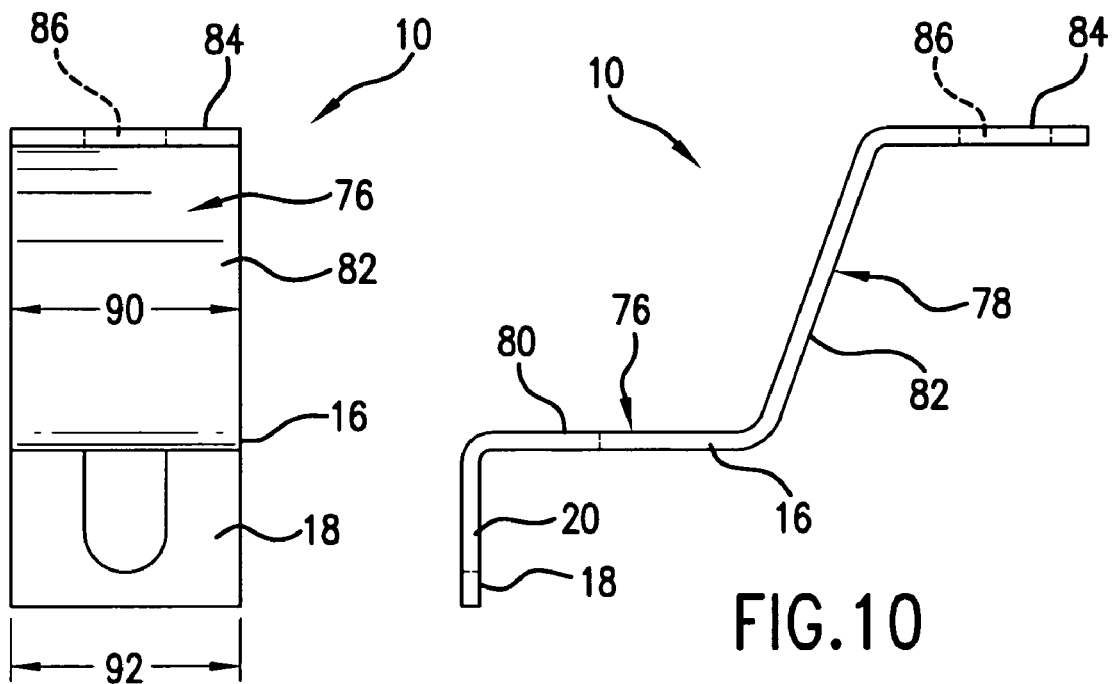
FIG.9
FIG.10

US 7,903,924 B2

CONNECTOR FOR SPLICING AND HANGING CABLE TRAYS

FIELD OF THE INVENTION

The present invention relates generally to a connector for use with a cable tray that functions to support conduits such as electrical or fiber optic cables. More particularly, the present application involves a connector that can be fastened with minimal effort to a cable tray in order to splice two portions of cable tray to one another or to provide for a bracket onto which a hanger rod may be mounted.

BACKGROUND

Cable trays are used to support various types of cable such as electrical, fiber optic and telecommunication cable in both indoor and outdoor applications. The cable tray is generally manufactured in sections that can be straight, curved or inclined. The various sections may be connected together in order to form a cable tray of a desired length and configuration. The cable tray may be of an enclosed type such that the bottom and side walls of the cable tray are plates that define generally flat surfaces. Alternatively, cable trays may be of an open or ladder type in which the side walls are formed as plates and the bottom wall is made of a plurality of lateral members that are spaced from one another so that open areas are present therebetween. It is also known to provide cable trays in a wire mesh form. Here, a series of longitudinal, lateral and vertical wires are attached to one another and configured into an open frame suitable for supporting a desired type of cable.

Current methods of splicing two sections of cable tray involve the use of mechanical fasteners such as bolts. For example, one known splice method provides for an L-shaped splice plate with locating studs that can be inserted into complimentary apertures of two adjacent portions of cable tray. The L-shaped splice plate is also provided with a plurality of apertures that align with complimentary apertures in the side walls of the cable tray portions. Bolts may be inserted through the aligned apertures in order to form a connection capable of retaining the two adjacent cable tray portions to one another. The L-shaped splice plate supports the bottom of the side walls to inhibit sagging of the connection over time or when subjected to significant loading. Although capable of connecting two adjacent portions of cable tray, such a splice plate connection requires a significant amount of time and labor as the plurality of bolts must be employed. Further, as cable trays are generally located in an elevated position the need to properly align the apertures and hold and insert the bolts may be difficult.

Although capable of splicing cable tray sections that have solid side walls, the aforementioned L-shaped splice plates are incapable of splicing wire cable tray portions. However, it is to be understood that other types of L-shaped splice plates are capable of splicing wire cable tray portions to one another. Splice plates capable of splicing wire cable tray portions typically include a pair of openings into which vertical wires of the cable tray portions can be inserted. A pair of pliers is then utilized by the installer in order to bend a tab of the splice plate in order to close off the opening into which the vertical wire of the cable tray is positioned. Although capable of splicing two wire cable tray portions together, the tabs of such splice plates function only to close the opening of the splice plate when actuated and do not function to pull the two cable tray portions together hence resulting in a weaker connection. Further, the two cable tray portions must be identically aligned in the height direction, the use of pliers increases the chance of injury, and the bent tabs may be subject to installer error as too little or too much bending can be imparted during the process.

Cable trays are generally suspended from a ceiling or other structure through the use of hanger rods. Lateral support beams are typically included and extend between and beyond the side walls of the cable tray. The hanger rods can be attached to the lateral support beams either at their midpoint or at their ends so that the hanger rods are either between the side walls of the cable tray or are not between the side walls of the cable tray. The lateral support beams increase the weight of the cable tray, increase the vertical profile of the cable tray, and require a significant amount of labor and time to be attached to the side walls of the cable tray. Further, the positioning of the lateral support beams or the hanger rod may interfere with the placement of cable held between the side walls of the cable tray. As such, there remains room for variation and improvement in the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which:

FIG. 8 is a perspective view of a connector configured as a cable tray hanger in accordance with another exemplary embodiment.

FIG. 9 is a back view of the connector of FIG. 8.

FIG. 10 is a side view of the connector of FIG. 8.

Figure 1:
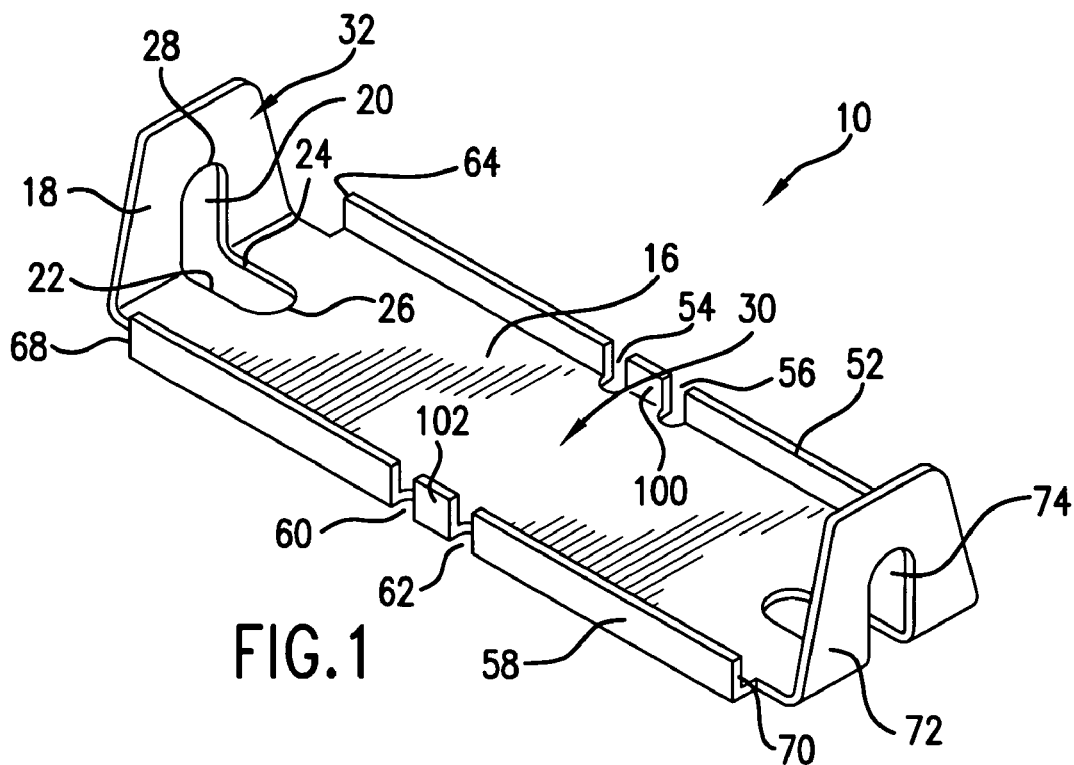
FIG. 1 is a perspective view of a connector configured as a cable tray splice in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a connector 10 that can be configured as a cable tray splice in order to splice a first cable tray portion 12 to a second cable tray portion 14, or a connector 10 that can be secured to a cable tray for use in mounting a hanger rod 88 thereon. The connector 10 may have a frame 16 with a flange 18 extending therefrom that defines an aperture 20. A tool 46 such as an open end wrench or a screwdriver can be inserted through the aperture 20 and the flange 18 can be bent around a component of the cable tray 12 in order to secure the connector 10 to the cable tray 12. The securing feature does not require the use of mechanical fasteners such as nuts or bolts and hence installation time and labor are reduced. Further, when configured as a cable tray splice, the connector 10 may be arranged so that bending of flanges 18 and 72 function to pull the cable tray portions 12 and 14 against one another to result in a more secure splice connection.

Figure 2:
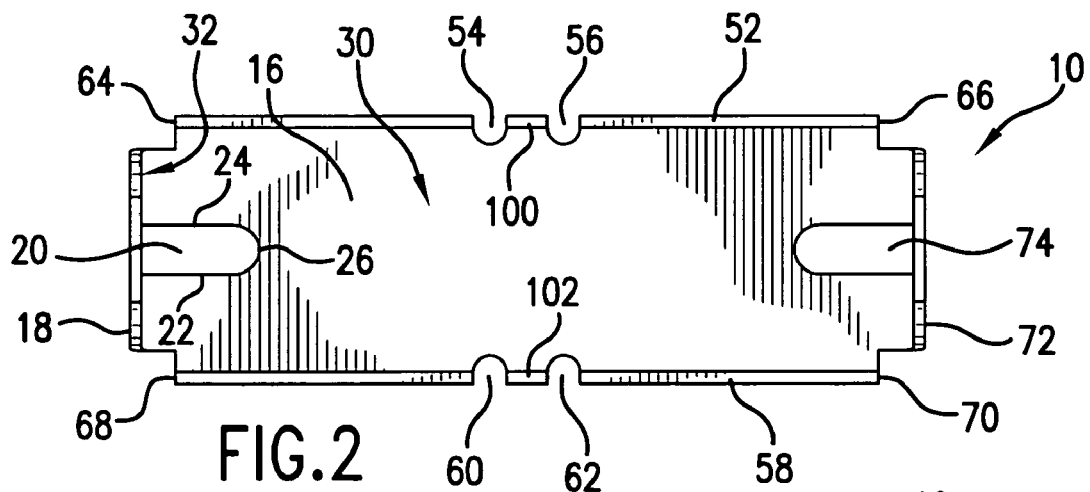
FIG. 2 is a front view of the connector of FIG. 1.
Figure 3:
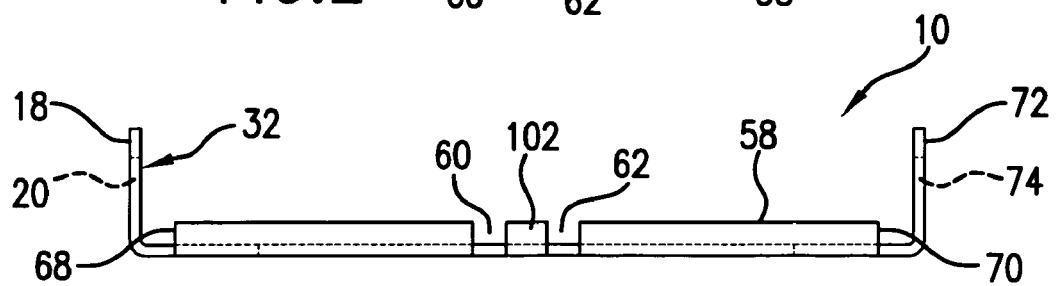
FIG. 3 is a side view of the connector of FIG. 1.

One exemplary embodiment of a connector 10 is illustrated in FIGS. 1-3. Here, the connector 10 is configured as a cable tray splice for use in splicing two portions 12 and 14 of cable tray to one another. The connector 10 can be made out of spring steel in accordance with one exemplary embodiment. However, it is to be understood that the connector 10 can be made of various materials in accordance with other exemplary embodiments. For example, the connector 10 may be made out of aluminum, plastic, steel, or a composite material in accordance with different exemplary embodiments. All of the components of the connector 10 may be made from the same material or various components of the connector 10 may be made from different materials. The connector 10 includes a frame 16 that may be generally elongated with a longer length than width 90. A flange 18 extends from an end of the frame 16 and may be formed integrally therewith. However, it is to be understood that the flange 18 and the frame 16 need not be integrally formed with one another in other exemplary embodiments. The frame 16 may include a flat surface 30 that extends generally over the entire length of the frame 16. The flange 18 may also have a flat surface 32. Before being shaped by the user, the flat surface 30 of the frame 16 may be oriented at an angle of 90° to the flat surface 32 of the flange 18. However, it is to be understood that the connector 10 may be arranged in other manners. For example, the flat surfaces 30 and 32 may be oriented at angles of 75°, 100°, 110° or 120° to one another. Further, the flat surfaces 30 and 32 may be oriented at an angle from 70° to 180° to one another in accordance with other exemplary embodiments.

The frame 16 and flange 18 define an aperture 20. As such, the aperture 20 is a continuous aperture that extends from the frame 16 to the flange 18. The aperture 20 may be symmetrical or asymmetrical in shape in accordance with various exemplary embodiments of the connector 10. The aperture 20 may thus be curved or angled depending upon the angular orientation of the frame 16 and flange 18. However, should these two components be straight with respect to one another, the aperture 20 may likewise extend from a single planar surface. As shown, aperture 20 includes a pair of sides 22 and 24 that are spaced a single, continuous distance from one another. Ends 26 and 28 are located at the ends of the sides 22 and 24 and are rounded. The aperture 20 can be variously shaped in other embodiments of the connector 10.

The connector 10 can be arranged so that a second flange 72 is present and extends from an end of the frame 16 opposite to flange 16. Second flange 72 and frame 16 may define a second aperture 74. The second flange 72 and second aperture 74 may be arranged in manners similar to the flange 18 and aperture 20 as described above and a repeat of this information is not necessary. Flange 18 and aperture 20 may be arranged in identical or different manners from the second flange 72 and second aperture 74 in accordance with various exemplary embodiments of the connector 10.

The frame 16 may also include an upper lip 52 that extends from the flat surface 30 at a 90° angle. However, the upper lip 52 may extend at an angle of up to 130° in accordance with other exemplary embodiments. A first opening 54 may be disposed through the upper lip 52. A second opening 56 may be spaced from the first opening 54 and may be likewise disposed through the upper lip 52. Openings 54 and 56 may be sized so as to extend to the upper surface 30 or may be sized so that one or both are spaced some distance from the upper surface 30. The frame 16 may also have a lower lip 58 that is located opposite the upper lip 52. The lower lip 58 may include a first opening 60 and a second opening 62. First openings 54 and 60 may be aligned with one another. In a similar manner, the second openings 56 and 62 may be aligned with one another. Lower lip 58 can be configured in a manner identically to that of the upper lip 52 and thus a repeat of this information is not necessary. Although shown as being arranged in identical manners, it is to be understood that the upper lip 52 and the lower lip 58 may be different from one another in other versions of the connector 10. The lips 52 and 58 need not be present in other embodiments of the connector 10.

Figure 4:
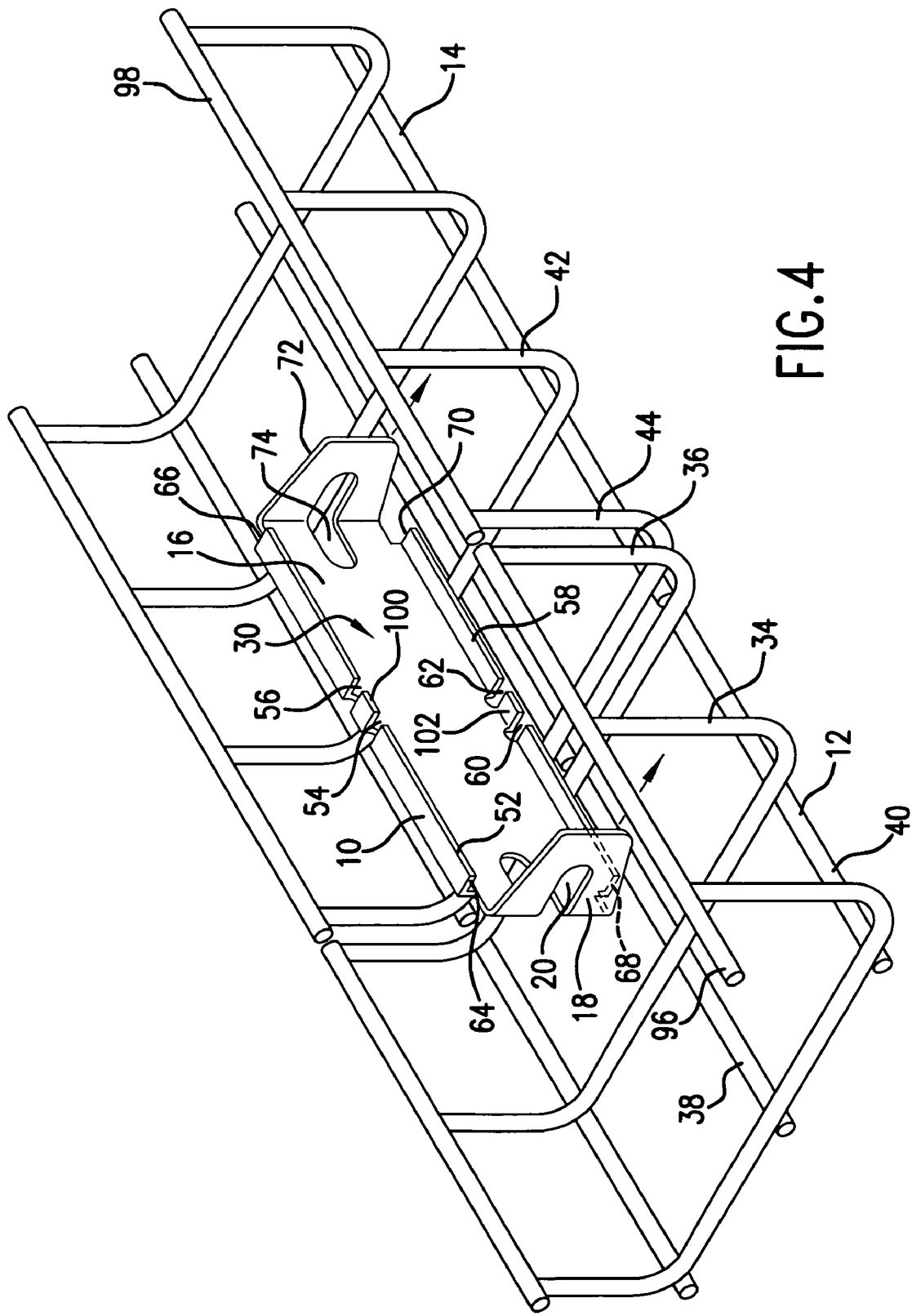
FIG. 4 is a perspective view of two adjacent cable tray portions and a connector prior to engagement with the cable tray portions.

First and second portions 12 and 14 of cable tray may be spliced to one another through use of the connector 10 and may be initially located end to end as illustrated in FIG. 4. As shown, the cable tray portions 12 and 14 are mesh type cable trays. However, the connector 10 may be used to splice cable tray portions 12 and 14 that are not mesh type in accordance with other embodiments. The connector 10 is positioned by the user on the inside of the cable tray portions 12 and 14 so as to face the inside of two adjacent side walls of the portions 12 and 14. The user may then move the connector 10 towards the cable tray portions 12 and 14 so that the connector 10 engages the portions 12 and 14. An end 64 of the upper lip 52 may engage or be positioned adjacent to a first vertical wire 34 of the first portion 12. Also, an end 68 of the lower lip 58 may engage or be positioned adjacent the first vertical wire 34. The connector 10 also engages the cable tray portions 12 and 14 so that a second vertical wire 36 of the first cable tray portion 12 is disposed within both the aligned first openings 54 and 60.

The connector 10 may engage the second cable tray portion 14 so that an end 66 of the upper lip 52 engages or is located adjacent to a first vertical wire 42 of the second portion 14 of cable tray. Also, an end 70 of the lower lip 58 may engage or be located adjacent to the first vertical wire 42. A second vertical wire 44 can be disposed within the aligned second openings 56 and 62 of the connector 10. Other engagement arrangements are possible between the connector 10 and the cable tray portions 12 and 14. For example, the vertical wires 34, 36, 42 and 44 need not be completely straight vertically but may be curved or otherwise modified in shape. The features of the connector 10 may be likewise adjusted in order to account for the shape of the various wires of the cable tray portions 12 and 14.

The connector 10 may engage the cable tray portions 12 and 14 so that the upper lip 52 engages or directly faces a longitudinal wire 96 of portion 12 and a longitudinal wire 98 of portion 14. In this regard, the upper lip 52 need not engage both longitudinal wire 96 and 98 but may engage only one or neither of these wires 96 and 98. As such, the vertical height of the cable tray portion 12 need not be identical to the vertical height of cable tray portion 14 during splicing of the portions 12 and 14. Such an arrangement may allow for greater flexibility when effecting the splice connection. The lower lip 58 may likewise engage or directly face other longitudinal wires of the cable tray portions 12 and 14 in a manner similar to the upper lip 52 and a repeat of this information is not necessary. In certain embodiments, the upper lip 52 may engage or directly face longitudinal wires 96 and 98 and the lower lip 58 may not engage or directly face longitudinal wires of the cable tray portions 12 and 14. The first opening 54 may be spaced from the second opening 56 such that a tab 100 is formed between the openings 54 and 56. The first opening 60 may be spaced from the second opening 62 and a tab 102 can be present between these two openings. The tabs 100 and 102 may prevent cable tray portions 12 and 14 with longitudinal wires 96 and 98 that stick out or are otherwise manufactured longer than they should be to not interfere with splicing. In this regard, the tabs 100 and 102 may each have a length that extends up to one quarter of an inch in the longitudinal direction. The tabs 100 and 102 may thus allow the cable tray portions 12 and 14 to be spaced from one another a distance so that interference brought about by possible overlapping or engaging ends of the cable tray portions 12 and 14 is avoided.

Figure 5:
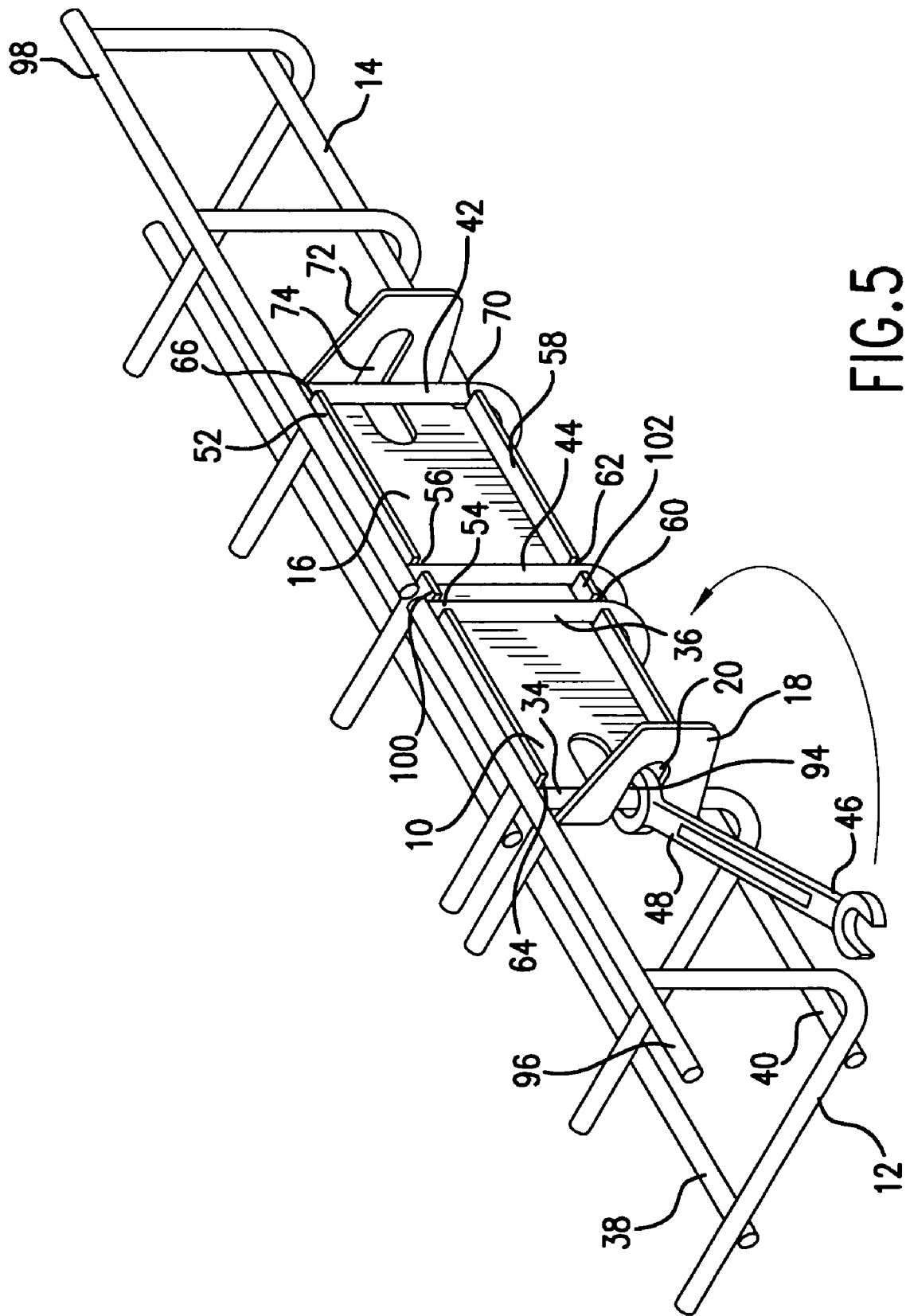
FIG. 5 is a perspective view as in FIG. 4 but with the connector engaging the cable tray portions and a tool inserted through an aperture of the connector.

After engagement with the cable tray portions 12 and 14, a tool 46 such as an open end wrench 48 may be inserted by the user into the aperture 20. The tool 46 need not be an open end wrench 48 in other embodiments but can be variously configured. For example, tool 46 may be a screwdriver 50, a flat blade, pliers, a knife, a hex wrench or a specially designed tool in other embodiments. The use of a common item such an open end wrench 48 ensures that such tool 46 is readily available. Insertion of the open end wrench 48 is illustrated in FIG. 5. Here, the user has inserted the open end wrench 48 into the aperture 20 and has engaged the open end wrench 48 with the first vertical wire 34. Engagement between these two components may be identified as a point of engagement 94. The tool 46 may thus extend completely through the aperture 20 located in the flange 18. Additionally, the tool 46 may extend completely or at least partially through the aperture 20 in the frame 16. The aperture 20 may be configured so as to provide clearance for the tool 46 so that interference with the connector 10 and cable tray portion 12 is avoided.

Figure 6:
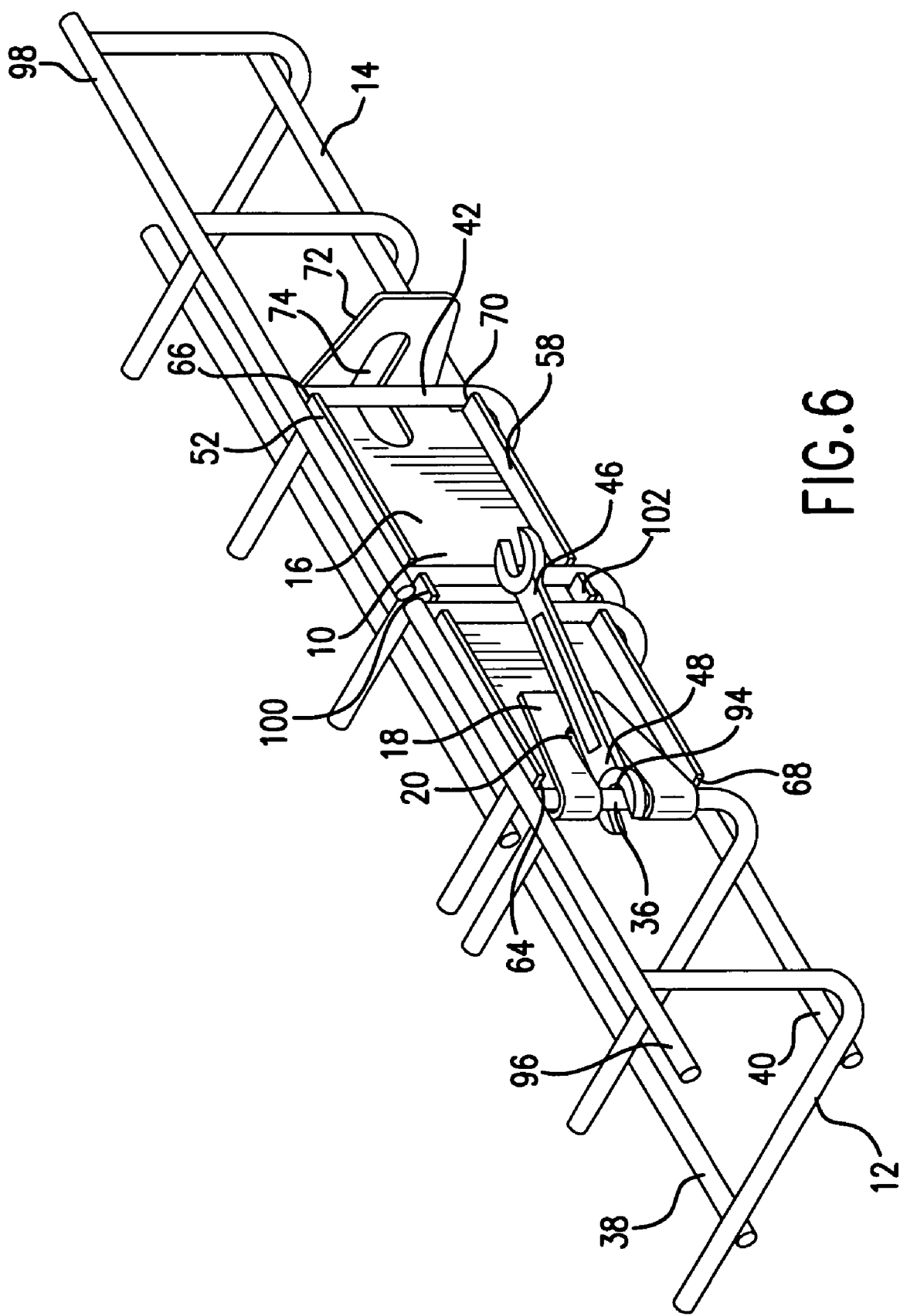
FIG. 6 is a perspective view as in FIG. 5 but with the tool rotated in order to effect bending of a flange of the connector.

The user may rotate the tool 46 about the first vertical wire 34 as illustrated in FIG. 6. The tool 46 engages the flange 18 and force applied by the tool 46 functions to bend the flange 18 about the first vertical wire 34. Rotation of the tool 46 about the point of engagement 94 may not be impeded by the structure of the connector 10 as the aperture 20 allows the tool 46 to move through both the flange 18 and the frame 16. The flange 18 is made of a material that deforms under the force applied but is strong enough to retain its shape once the force is removed. As such, the flange 18 does not spring back into its initial position once the tool 46 is disengaged but rather remains in its bent shape. The flange 18 may be bent so that it is wrapped around 180° of the first vertical wire 34. Alternatively, the flange 18 may be bent so that it is wrapped from 120° to 180°, from 180° to 190°, from 180° to 200°, or from 180° to 270° about first vertical wire 34. The aperture 20 may thus be bent about itself so that a line of sight through the aperture 20 may extend through the thickness of the connector 10 twice. The flange 18 may be the only component of the connector 10 that contacts the first vertical wire 34 when the connector 10 is attached. Alternatively, the flange 18 and the frame 16 may contact the first vertical wire 34 when the connector 10 is attached.

Figure 7:
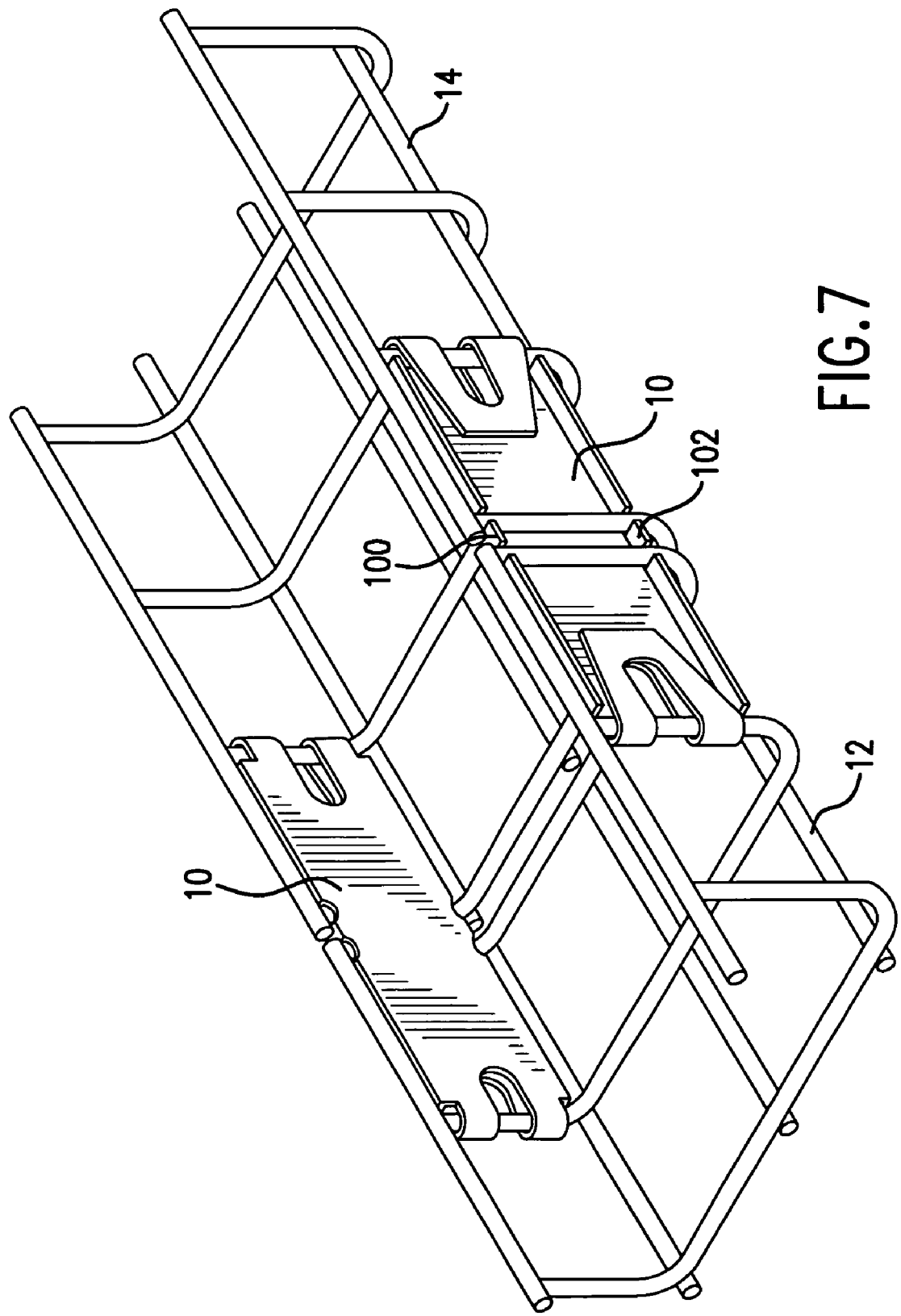
FIG. 7 is a perspective view of two adjacent cable tray portions that are spliced together through the use of a pair of connectors.

The user may then insert the tool 46 into the second aperture 74 to effect rotation of the second flange 72 about the first vertical wire 42 of the second cable tray portion 14. Steps involved in this procedure may be the same as that previously described with respect to flange 18 and a repeat of this information is not necessary. Bending of the second flange 72 about the first vertical wire 42 may function to connect the connector 10 to the second portion 14. The bending of flanges 18 and 72 towards one another may cause the connector 10 to draw the first portion 12 and second portion 14 towards one another so that a stronger splice connection is realized. FIG. 7 illustrates the connector 10 secured to both the first portion 12 and second portion 14. An additional connector 10 can be employed on the opposite side walls of the first and second portions 12 and 14 in order to more securely engage the connection. The two connectors 10 can be provided in an identical manner to one another or may be configured differently from one another as desired. Further, although shown as having a pair of connectors 10, the portions 12 and 14 may be connected to one another though the use of but a single connector 10 in accordance with other exemplary embodiments.

The connector 10 may be arranged so as to be used as a cable tray hanger for attachment to a hanger rod 88 to effect suspension of the cable tray 12. FIGS. 8-10 illustrate one exemplary embodiment of the connector 10 as configured as a cable tray hanger. The frame 16 of connector 10 has an upper surface 76 and an oppositely disposed lower surface 78. Fame 16 also includes a first portion 80 and a second portion 82. The upper surface 76 of the frame 16 at the first portion 80 can be oriented at an angle to the upper surface 76 at the second portion 82. This angle may be 135° or may be from 90° to 180° in accordance with various exemplary embodiments. A flange 18 may extend from an end of the first portion 80. The lower surface 78 of frame 16 may be oriented at an angle of 90° to the complimentary lower surface of flange 18. In other embodiments, the lower surface 78 may be oriented at an angle from 75° to 90°, from 80° to 100° or from 90° to 120° to the complimentary lower surface of the flange 18. Both the first portion 80 of the frame 16 and the flange 18 may define an aperture 20. The aperture 20 and flange 18 may be configured as previously discussed and a repeat of this information is not necessary. The flange 18 may have a width 92 that is the same as the width 90 of the first portion 80. However, other embodiments are possible in which the width 92 at various portions of the flange 18 is less than the width 90 of the first portion 80 at the connection between the first portion 80 and the flange 18.

Connector 10 also includes a hanger rod mounting portion 84 that extends from an end of the second portion 82. The hanger rod mounting portion 84 defines a hanger rod aperture 86 therethrough. The upper surface 76 of the frame 16 at the hanger rod mounting portion 84 may be oriented at a 225° angle to the upper surface 76 of the frame 16 at the second portion 82. The upper surface 76 at the first portion 80 may be parallel to the upper surface 76 at the hanger rod mounting portion 84. The flange 18, first portion 80, second portion 82 and the hanger rod mounting portion 84 may be integrally formed with one another or may be separate components. Further, these features may be made of the same material in accordance with certain exemplary embodiments.

Figure 11:
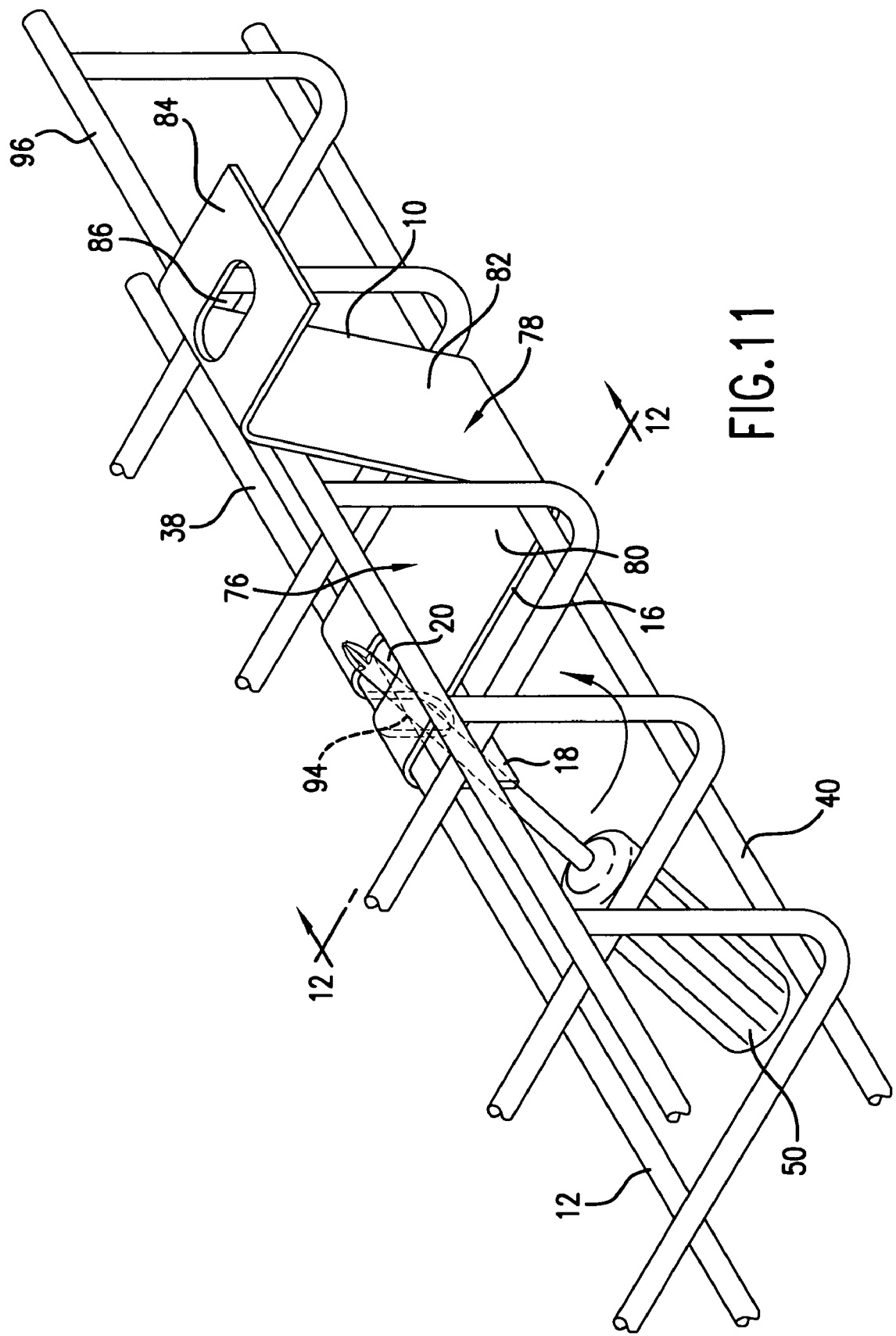
FIG. 11 is a perspective view of a connector engaging a cable tray in which a tool is disposed through an aperture of the connector.
Figure 12:
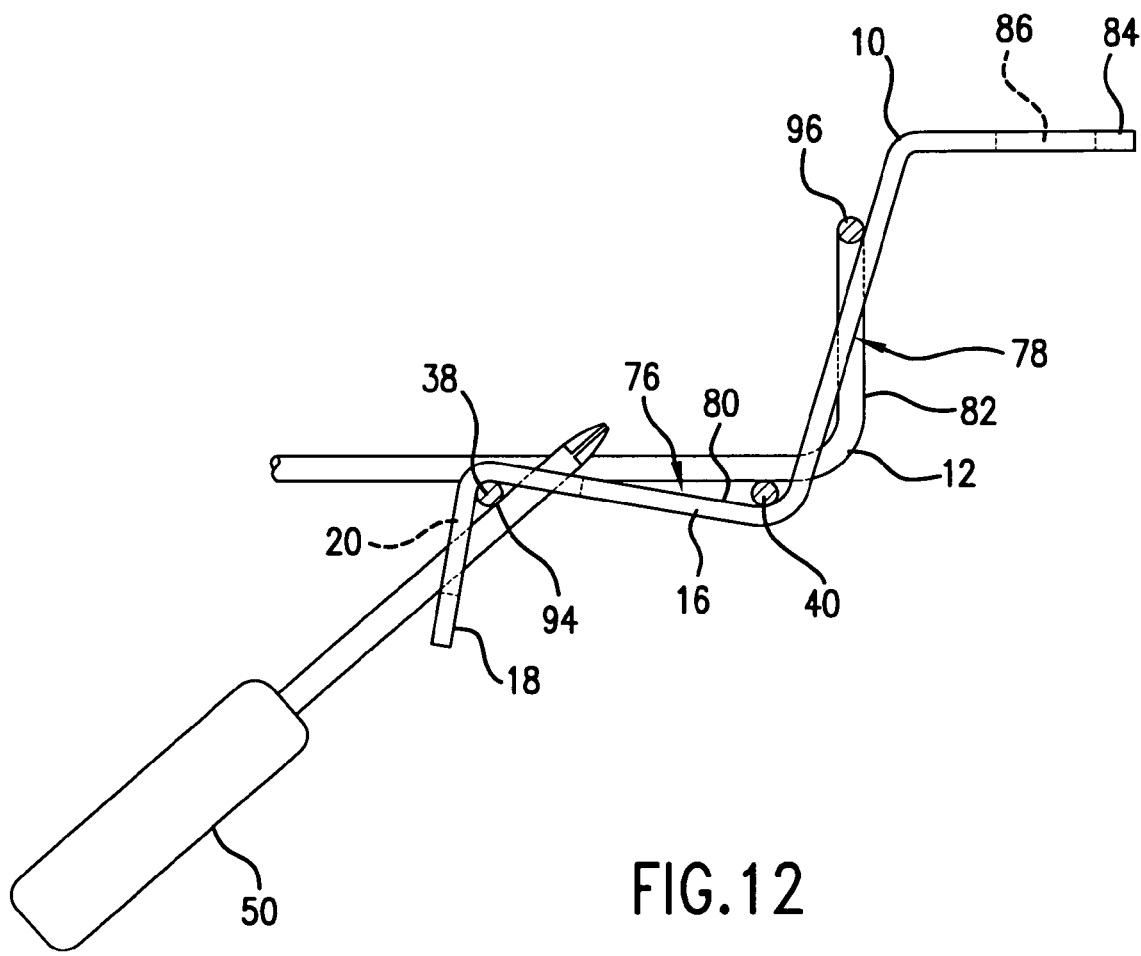
FIG. 12 is a cross-sectional view taken along line 12-12 of FIG. 11.

FIGS. 11 and 12 illustrate a cable tray 12 of a mesh type onto which a connector 10 for use as a cable tray hanger has been disposed. The user may orient the connector 10 so that the flange 18 lies against a first longitudinal wire 38 of the cable tray 12. In this regard, the lower surface of the connector 10 may engage the first longitudinal wire 38. The connector 10 can also be oriented so that the upper surface 76 of the frame 16 engages a second longitudinal wire 40 of the cable tray 12. The second portion 82 and the hanger rod mounting portion 84 may extend outboard from the cable tray 12. Additionally, the hanger rod mounting portion 84 may be located vertically above the cable tray 12. A user may insert a tool 46, such as a screwdriver 50, through the aperture 20 and against the first longitudinal wire 38 at a point of engagement 94. Tool 46 may also be disposed through the aperture 20 at the first portion 80 as the aperture 20 is aligned between the first portion 80 and the flange 18. Although described as being a screwdriver 50, it is to be understood that the tool 46 may be provided differently as previously discussed and that illustration as a screwdriver 50 is for sake of example.

Figure 13:
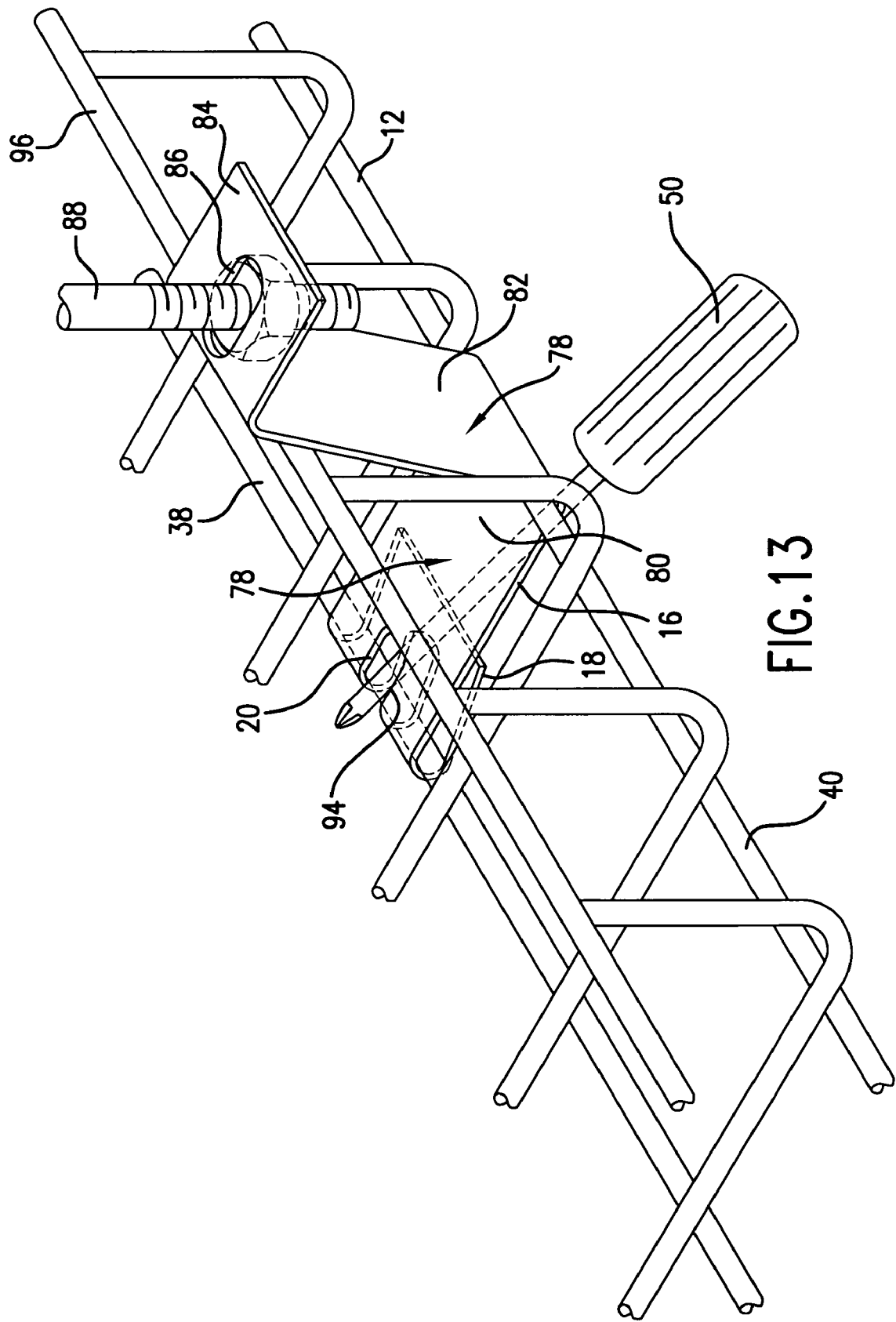
FIG. 13 is a perspective view as in FIG. 11 but with the tool rotated in order to bend a flange of the connector, and with a hanger rod attached to the connector.
Figure 14:
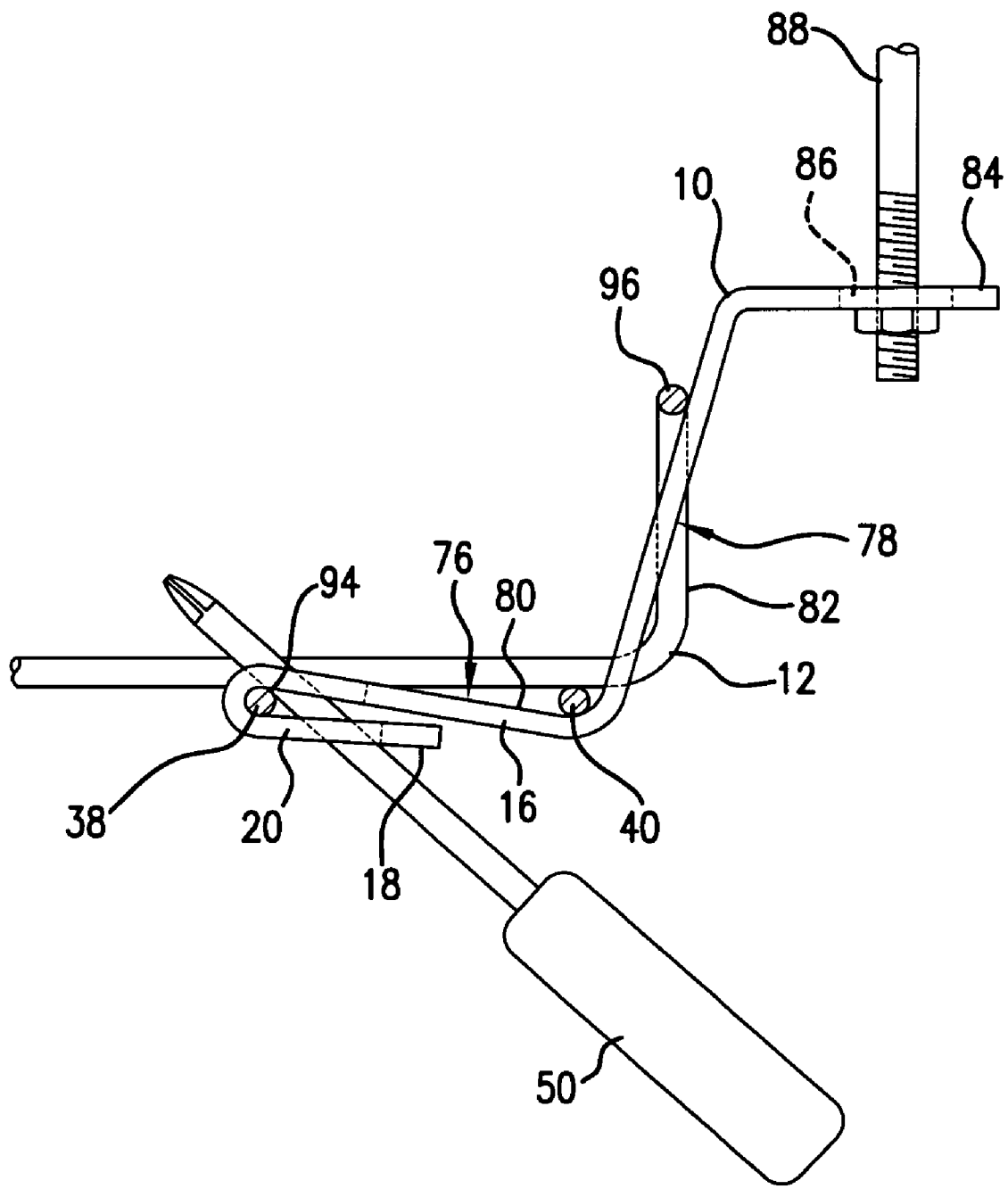
FIG. 14 is a cross-sectional view taken along line 14-14 of FIG. 13.

The user may apply force with the tool 46 so as to rotate same about the point of engagement 94. In this regard, the tool 46 can be rotated about the first longitudinal wire 38 and can engage the flange 18 and force same to be bent about the first longitudinal wire 38. Such bending is illustrated in FIGS. 13 and 14. The arrangement of aperture 20 allows the tool 46 to be rotated to effect the desired bending of flange 18 without interference with the connector 10. Flange 18 may be bent around 120°, 180°, or 270° of the first longitudinal wire 38 in accordance with various embodiments. Bending of flange 18 about the first longitudinal wire 38 effects connection between the connector 10 and the cable tray 12. Engagement of the second longitudinal wire 40 with the upper surface 76 of the frame 16 assists in causing the cable tray 12 to be supported by the connector 10.

A hanger rod 88 can be disposed through the hanger rod aperture 86. The bottom of the hanger rod 88 may be externally threaded onto which a nut may be disposed in order to effect attachment of the hanger rod 88 to the hanger rod mounting portion 84. The hanger rod aperture 86 can be a slot that is five sixteenths inch wide and the hanger rod 88 can be one quarter inch in diameter. The hanger rod 88 can be connected to the connector 10 so that the connector 10, and hence the cable tray 12, can be suspended from a ceiling or other structure. Additional connectors 10 can be employed as needed on the cable tray 12 in order to provide sufficient points of suspension for the cable tray 12. Although shown as being used with a mesh type cable tray 12, it is to be understood that the connector 10 when used as a cable tray hanger need not be used strictly with mesh type cable trays 12 but can be used with other types.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A cable tray splice for use in connecting a first portion and a second portion of cable tray to one another, comprising:

a frame configured for being placed against the first portion of the cable tray and configured for being placed against the second portion of the cable tray, wherein the first portion has a first vertical wire and a second vertical wire, and wherein the second portion has a first vertical wire and a second vertical wire, wherein the second vertical wire of the first portion is located at an end of the first portion, and wherein the second vertical wire of the second portion is located at an end of the second portion;

a first flange located at an end of the frame, wherein the first flange is capable of being shaped by a user, wherein the first flange and the frame define an aperture, wherein the first and second portions are arranged with respect to one another such that the second vertical wires of the first and second portions are both located between the first vertical wires of the first and second portions, wherein the first flange engages the first vertical wire of the first portion; and a second flange located at an end of the frame that is opposite from the end at which the first flange is located, wherein the second flange is capable of being shaped by a user, wherein the second flange and the frame define a second aperture, wherein the second flange engages the first vertical wire of the second portion.

2. The cable tray splice as set forth in claim 1, wherein the aperture is slot shaped having sides that are the same distance from one another, wherein the aperture has a pair of ends that are rounded.

3. The cable tray splice as set forth in claim 1, wherein the frame has a flat surface and wherein the flange has a flat surface, wherein the flat surface of the frame and the flat surface of the flange are oriented at an angle of ninety degrees to one another before the flange is shaped by the user.

4. The cable tray splice as set forth in claim 1, wherein the flange is configured for being shaped around the first vertical wire of the first portion of the cable tray by a user for use in effecting connection between the cable tray splice and the first portion of the cable tray.

5. The cable tray splice as set forth in claim 4, wherein the aperture is sized such that a portion of an open end wrench or a portion of a screwdriver is capable of being disposed through the aperture to effect engagement with the flange and the first vertical wire of the first portion for use in bending the flange around the first vertical wire of the first portion.

6. The cable tray splice as set forth in claim 1, wherein the frame has an upper lip that has a first opening and a second opening in which the first opening is spaced from the second opening, wherein a first tab is present between the first opening and the second opening of the upper lip, wherein the frame has a lower lip that has a first opening and a second opening in which the first opening is spaced from the second opening, wherein a second tab is present between the first opening and the second opening of the lower lip.

7. The cable tray splice as set forth in claim 6, wherein the upper and lower lips are configured for having their ends located adjacent the first vertical wire of the first portion of cable tray, wherein the upper and lower lips are configured for having their opposite ends located adjacent the first vertical wire of the second portion of cable tray, wherein the first openings of the upper and lower lips are aligned with one another and are configured for receiving the second vertical wire of the first portion of cable tray, and wherein the second openings of the upper and lower lips are aligned with one another and are configured for receiving the second vertical wire of the second portion of cable tray.

8. The cable tray splice as set forth in claim 1, wherein the frame is integrally formed with the first flange and the second flange.

9. The cable tray splice as set forth in claim 8, wherein the first flange is configured for being shaped around the first vertical wire of the first portion of the cable tray by a user for use in effecting connection between the cable tray splice and the first portion of the cable tray, wherein the second flange is configured for being shaped around the first vertical wire of the second portion of the cable tray by a user for use in effecting connection between the cable tray splice and the second portion of the cable tray.

10. A cable tray hanger for use in suspending a cable tray, comprising:
  a frame configured for being placed against a cable tray, wherein the frame has an upper surface and a lower surface, wherein the frame has a hanger rod mounting portion; and
  a flange located at an end of the frame, wherein the flange is capable of being shaped by a user, wherein the flange and the frame define an aperture, wherein the flange has an upper surface and a lower surface;
  wherein the cable tray has a first longitudinal wire and a second longitudinal wire, wherein the lower surfaces of the frame and the flange both engage the first longitudinal wire, wherein the upper surface of the frame engages the second longitudinal wire, wherein the second longitudinal wire is located outboard of the first longitudinal wire, and wherein the cable tray has a third longitudinal wire that is located in the vertical direction of the cable tray at a location above the first longitudinal wire and the second longitudinal wire.

11. The cable tray hanger as set forth in claim 10, wherein the aperture is slot shaped having sides that are the same distance from one another, wherein the aperture has a pair of ends that are rounded.

12. The cable tray hanger as set forth in claim 10, wherein the flange is configured for being shaped around the first longitudinal wire of the cable tray by a user for use in effecting connection between the cable tray hanger and the cable tray.

13. The cable tray hanger as set forth in claim 10, wherein the frame has a first portion and a second portion, wherein the upper surface of the frame at the first portion and the upper surface of the frame at the second portion are oriented at an angle to one another, wherein the hanger rod mounting portion extends from an end of the second portion, wherein the upper surface of the frame at the hanger rod mounting portion is oriented at an angle to the upper surface of the frame at the second portion, wherein the hanger rod mounting portion defines a hanger rod aperture for receipt of a hanger rod.

14. The cable tray hanger as set forth in claim 13, wherein the flange has a width that is the same as the width of the end of the frame at which the flange is located, wherein the flange, the first portion of the frame, the second portion of the frame, and the hanger rod mounting portion are integrally formed as a single piece, wherein the aperture is sized such that a portion of an open end wrench or a portion of a screwdriver is capable of being disposed through the aperture to effect engagement with the flange and the first longitudinal wire of the cable tray for use in bending the flange around the first longitudinal wire of the cable tray.

* * * * *